United States Patent [19]

Andres et al.

[11] Patent Number: 4,740,741
[45] Date of Patent: Apr. 26, 1988

[54] VOLTAGE SUPPLY SYSTEM FOR A PASSENGER PROTECTION INSTALLATION IN A VEHICLE

[76] Inventors: Rudolf Andres, Watzmannstrasse 59, 7032 Sindelfingen; Heinz W. Knoll, Schmellbachstrasse 38, 7000 Stuttgart 80; Volker Petri, Calwer Strasse 16, 7031 Aidlingen 3; Luigi Brambilla, Schurwaldstrasse 11, 7030 Boeblingen; Alban Bossenmaier, Urbanstrasse 77, 7000 Stuttgart 1, all of Fed. Rep. of Germany

[21] Appl. No.: 831,261

[22] Filed: Feb. 20, 1986

[30] Foreign Application Priority Data

Feb. 23, 1985 [DE] Fed. Rep. of Germany ....... 3506487

[51] Int. Cl.$^4$ .......................... G05F 5/00; B60R 21/32
[52] U.S. Cl. .................................. 323/303; 280/735; 340/52 H
[58] Field of Search ............... 323/284, 285, 299, 303, 323/351; 363/142, 143; 280/735; 340/669, 52 H

[56] References Cited

U.S. PATENT DOCUMENTS

| 3,916,376 | 10/1975 | Tuttle | 340/669 |
| 4,315,208 | 2/1982 | McElroy et al. | 323/303 |
| 4,540,892 | 9/1985 | Carvalho | 363/142 |
| 4,553,196 | 11/1985 | Tokuyama et al. | 363/21 |

FOREIGN PATENT DOCUMENTS 3207216 9/1983 Fed. Rep. of Germany ...... 363/142

OTHER PUBLICATIONS

IBM Technical Disclosure Bulletin, vol. 28, No. 3, Aug. 1985, p. 1246.

*Primary Examiner*—Patrick R. Salce
*Assistant Examiner*—Judson H. Jones

[57] ABSTRACT

A voltage supply device for a passenger protection installation in a motor vehicle, especially for an air bag, by means of which the passenger protection installation is kept fully operational even at small vehicle battery voltages by means of a low-power voltage converter which is connected exclusively in a control circuit.

16 Claims, 1 Drawing Sheet

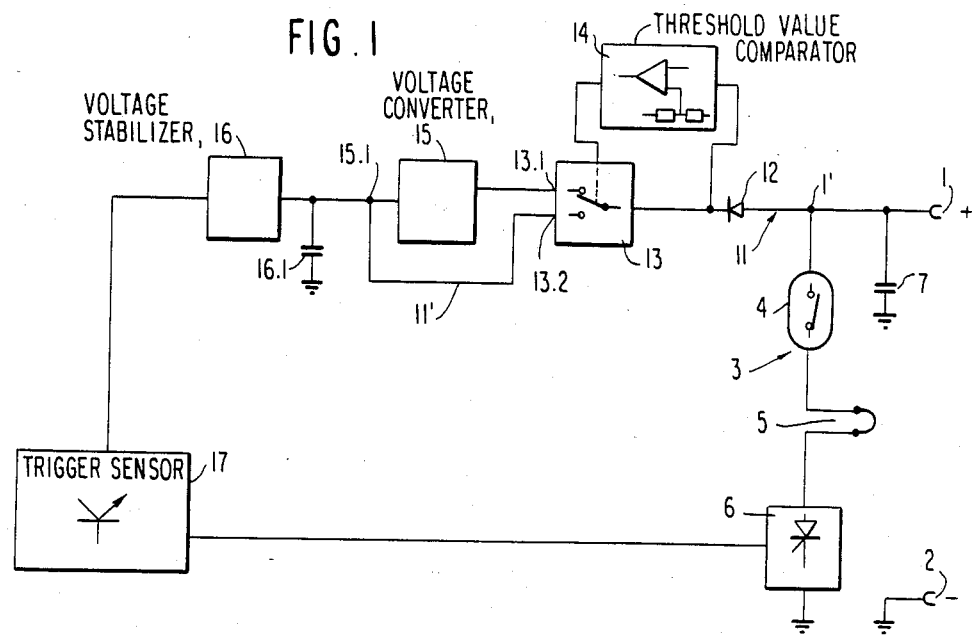
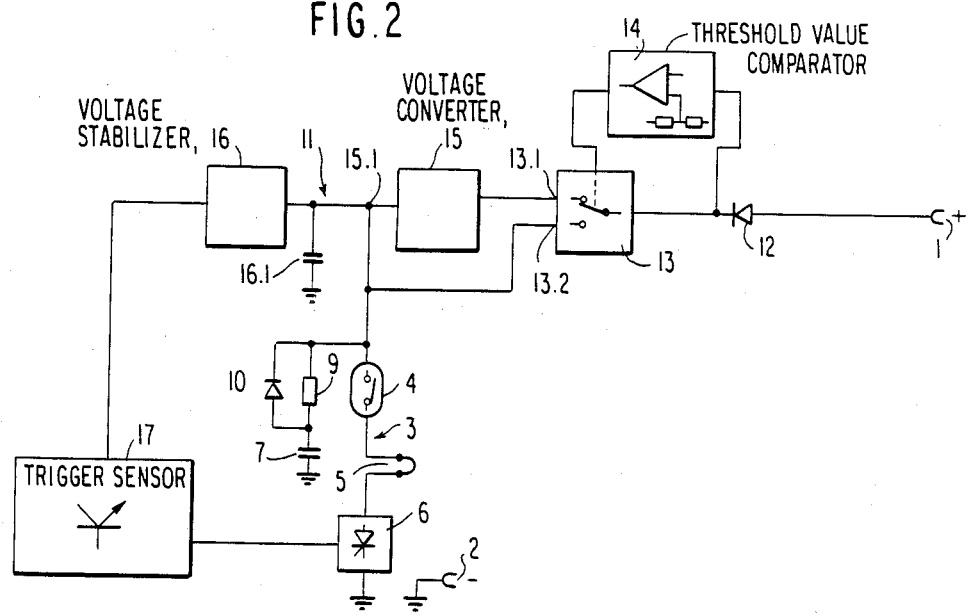

VOLTAGE SUPPLY SYSTEM FOR A PASSENGER PROTECTION INSTALLATION IN A VEHICLE

The present invention relates to a voltage supply system for a passenger protection installation in a vehicle, especially for an air bag impact protection installation with an ignition circuit connected between the positive terminal and ground of the vehicle battery and including a safety switch, at least one primer pellet and a controllable power switch and with a control circuit including a voltage stabilizer for a trigger sensor which is electrically connected with the power switch for the control thereof.

A voltage supply device of the aforementioned type for an air bag is already described in the DE-OS No. 32 07 216 with an ignition circuit connected between the positive potential and ground of the vehicle battery and containing a safety switch, at least one primer pellet and a controllable power switch. The power switch is thereby controlled by way of a control circuit in which is connected a voltage stabilizer or regulator that always supplies a triggering sensor with constant input reference voltage for the invariable determination of the integration progress dU/dt. Generally such passenger-protecting installations which represent life-saving systems should remain operational over the entire operating voltage range in which the motor vehicle operates, i.e., also with operating voltages of, for example, only 4 volts (V). However, since the trigger sensor operates only with a constant voltage of at least 5 volts and the operational amplifier integrated into the same then requires a supply voltage of at least 6 volts, the functioning of the installation would no longer be assured with a voltage drop of the battery voltage to 4 volts. In order to prevent this, a voltage converter could be connected in a known manner into the circuit between the positive potential of the battery and the input into the circuit, which converts any occurring operating voltages of, for example, 4 to 9 volts to 12 volts. This converter would thereby have to supply a relatively high current in order to be able to supply with the required power both the entire control circuit as also the ignition circuit. However, such types of voltage converters are elaborate, large and correspondingly expensive and their failure rate is relatively high because many components are required that cannot be integrated such as, for example, transformers.

Furthermore, a safety installation for motor vehicle passengers is known (DE-OS No. 23 57 382) in which a condenser is connected in parallel to an ignition circuit which, in case the battery voltge should drop off, is to continue to supply a sufficient operating voltage.

It is the object of the present invention to so further develop a voltage supply device of the aforementioned type from a circuit point of view and taking into consideration cost and component expenditures and failure safety that the functioning of the passenger protection installation is still assured also with very small operating voltages.

The underlying problems are solved according to the present invention in that a storage condenser is connected in parallel with the ignition circuit, in that the control circuit, on the other hand, is connected together with the ignition circuit to the positive potential and in that an electronic changeover switch controllable by a threshold comparator and a voltage-increasing or multiplying voltage converter are connected in series between the connections of the control circuit with the ignition circuit, on the one hand, and the down-regulating voltage stabilizer, on the other, whereby an output of the changeover switch is directly connected with the output of the voltage converter. In the alternative, the underlying problems are solved according to the present invention in that a storage condenser is connected in parallel with the ignition circuit and in that an electronic changeover switch controllable by a threshold comparator is arranged in the feed line connected with the positive potential and leading to the ignition circuit, whereby a down-regulating voltage stabilizer a voltage-increasing or multiplying voltage converter is connected between one output of the changeover switch and whose output is further connected with the other output of the changeover switch and with the ignition circuit.

These and other objects, features and advantages of the present invention will become more apparent from the following description when taken in connection with the accompanying drawing which shows, for purposes of illustration only, two embodiments in accordance with the present invention, and wherein:

FIG. 1 is a schematic block diagram of a first embodiment of a voltage supply device in accordance with the present invention; and FIG. 2 is a schematic block diagram of a modified embodiment of a voltage supply device in accordance with the present invention.

Referring now to the drawing wherein like reference numerals are used in the two views to designate like parts, and more particularly to FIG. 1, the positive potential of a vehicle battery is designated by reference numeral 1 and the ground of the battery by reference numeral 2; the operating voltage exists between these two points. An ignition circuit generally designated by reference numeral 3 is also connected between these two points 1 and 2, whereby the ignition circuit includes in series a safety switch 4, ignition or primer pellets 5 and a controllable power switch 6. A storage condenser 7 of large capacity if connected in parallel with the ignition circuit 3.

A control circuit generally designated by reference numeral 11 branches off at the potential point 1' which is electrically connected at the other end thereof with the power switch 6 for the control thereof. The power switch 6 is constructed as thyristor. In the case of an incorrect polarity connection of the apparatus, the thyristor is operated in the blocking direction and thus no destruction of the sytem can occur. Furthermore, in the case of an incorrect polarity connection, a protecting diode 12 protecting against incorrect polarity connections which is provided in the control circuit 11 after the potential point 1', prevents a destruction of the control part. An electronic changeover switch 13—for example, formed by a corresponding diode circuit—which is controllable by a threshold value comparator 14, a voltage-increasing or multiplying voltage converter 15, a down-regulating voltage stabilizer or regulator 16 and the trigger sensor 17 constructed as data-detecting and evaluation electronics of known type are connected in series in the control circuit 11. Whereas the one output 13.1 of the changeover switch 13 is connected with the input of the voltage converter 15, the other output 13.2 of the changeover switch 13 is directly connected with the output 15.1 of the voltage converter 15; the voltage converter 15 is therefore by-passed by the connection 11'. Additionally, a condenser 16.1 for the suppression of any eventual changeover voltage peaks may be connected ahead of the voltage stabilizer 16.

With normal operating voltage (for example 10–16 V)—all values are indicated only as examples—on the other hand, the storage condenser 7 is charged and, on the other, this operating voltage is also present at the control circuit 11. However, the threshold comparator 14 (whose threshold amounts, for example, to 9–10 V), does not energize at this operating voltage the changeover switch 13 so that the latter connects the input directly with the output 13.2, the voltage converter 15 remains inactive by reason of the connection 11' and the operating voltage also is present at the voltage stabilizer 16 (input voltage, for example, 7–16 V). The voltage stabilizer 16 supplies the trigger sensor 17 with the required constant voltage (for example, 5 V). Thus, the entire installation is capable of proper functioning. If, however, the operating voltage drops, for example, to 4 V, then the control circuit 11 could no longer be operated with this voltage. However, the threshold comparator 14 recognizes this voltage drop which, by reason of dropping below the threshold value switches over the electronic changeover switch 13 and connects the input thereof by way of the output 13.1 with the voltage converter 15 which makes available to the voltage stabilizer 16 a correspondingly required higher voltage so that at the output thereof again the constant voltage of 5 V required by the trigger sensor is available. Since the voltage converter 15 according to the present invention is connected in the control circuit, it can be recognized that the same has to be designed only for small power—corresponding to the power required by the control circuit—, i.e., is constructed very small and cost-favorable and adapted to be integrated. Its structural volume is smaller by a factor of 1,500 compared to known converters and the converter current is smaller than by 100 mA.

Since the parallelly connected primer pellets 5 are of very low ohmic resistance, they require only a small ignition voltage, for example, 2 V with a 2 ohm ignition pellet. Since an on-voltage drop smaller than 2 V occurs at the power switch 6 constructed as thyristor, a voltage supply system is assured by means of the illustrated embodiments so that both the ignition circuit as also the trigger sensor continue to be operational down to operating voltages of about 4 V.

In FIG. 2 the components corresponding to those of FIG. 1 are again designated by the same reference numerals. Differing from FIG. 1, the ignition circuit 3, properly speaking, is now connected in FIG. 2 to the connection 11' between the one output 13.2 of the changeover switch 13 and the output 15.1 of the voltage converter 15. Again with normal operating voltage, the threshold value comparator 14 does not yet respond so that the changeover switch 13 applies the positive potential to the output 15.1 of the converter 15 by way of its output 13.2 and by way of the connection 11' bypassing the converter 15 and thus also applies the positive potential of the battery to the voltage stabilizer or regulator 16 which again supplies the trigger sensor 17 with a constant voltage. However, at the same time, the storage condenser 7 is also charged by way of the connection 11' and the operating voltage is also present at the ignition circuit 3. In lieu of the thyristor 6, also a transistor can be used. A safety against incorrect polarity connections is provided by the diode 12.

If, however, the operating voltage again drops, for example, to 4 V, then the threshold comparator 14 recognizes this voltage drop and controls the changeover switch 13 in such a manner that the latter connects the positive potential with its output 13.1. Thus, this low voltage also exists at the voltage converter 15 which now activated, on the one hand, makes available to the voltage stabilizer or regulator 16 a correspondingly required higher voltage and, on the other, applies this higher voltage also the storage condenser 7. Thus, even with a low operating voltage the storage condenser 7 is always charged to a relatively high voltage by way of the resistance 9. Similarly, the control circuit 11 is always supplied at least with the necessary voltage. Thus, no reduction in the ingnition delay time can occur.

The passenger protection installation is ignited when during an accident, on the one hand, the trigger sensor 17 controls the power switch 6 and, on the other, the externally acting mechanical deceleration has closed the safety switch 4. The energy necessary for the ignition of the primer pellets 5 is thereby obtained from the storage condenser 7 by way of the diode 10, whereby a blocking circuit in the converter 15 prevents any eventual feedback on the converter during the ignition. It can also be seen from this embodiment that the converter 15 has to be designed from a power point of view only corresponding to the necessary supply power of the control circuit.

The converter 15 is thus in operation only at voltages, at which the vehicle power supply network is not in order. By reason of its small size, it can be integrated on a chip. Both factors serve to increase the operating reliability of the passenger protection installation.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A motor vehicle passenger protection voltage supply device for a passenger protection installation in a vehicle, comprising ignition circuit means for providing ignition current to an engine operatively connected between positive potential and ground of a vehicle battery and including safety switch means for closing said ignition circuit means in response to deceleration of said vehicle, at least one primer pellet means for fusibly connecting said safety switch means and controllable power switch means, control circuit means including voltage stabilizer means for providing a stabilized voltage for a trigger sensor means which is operatively connected with the power switch means for the control thereof, a storage condenser means for storing voltage operatively connected in parallel with the ignition circuit means, the control circuit means being operatively connected together with the ignition circuit means to the positive potential and including between its connection with the ignition circuit means, on the one hand and the voltage stabilizer means, on the other, a voltage converter means for converting voltage from one voltage level to another voltage level, a series circuit containing an electronic changeover switch means having at least two outputs for switchably connecting the voltage converter means at one said output into said control circuit means, said changeover switch means being controllable by a threshold comparator means, with one said output of the changeover switch means being directly connectable with the output of the voltage converter means.

2. A motor vehicle passenger protection voltage supply device for a passenger protection installation in a vehicle, comprising ignition circuit means for providing ignition current to an engine operatively connected between positive potential and ground of a vehicle battery and including safety switch means for closing said ignition circuit means in response to deceleration of said vehicle, at least one primer pellet means for fusibly connecting said safety switch means and a controllable power switch means, control circuit means including a voltage regulator means for providing a regulated voltage for a trigger sensor means which is operatively connected with the power switch means for the control thereof, a storage condenser means for storing voltage operatively connected in parallel with the ignition circuit means, electronic changeover switch means having at least two outputs arranged in a supply line for switchably connecting the positive potential with the ignition circuit means, threshold comparator means for controlling the changeover switch means, a voltage converter means for converting voltage operatively connected between one said output of the changeover switch means and the voltage stabilizer means, an output of said voltage converter means being further operatively connected with the other said output of the changeover switch means and with the ignition circuit means.

3. A voltage supply device according to claim 1, wherein the threshold comparator means upon reaching a predetermined minimum voltage of the vehicle battery energizes the electronic changeover switch means and the latter then operatively connects the voltage converter means with the positive potential of the vehicle battery.

4. A voltage power supply device according to claim 3, wherein a diode protecting against incorrect polarity connections is operatively connected ahead of the electronic changeover switch means.

5. A voltage supply device according to claim 4, wherein a further condenser means is operatively connected with the input of the voltage stabilizer means.

6. A voltage power supply device according to claim 1, wherein a diode protecting against incorrect polarity connections is operatively connected ahead of the electronic changeover switch means.

7. A voltage supply device according to claim 1, wherein a further condenser means is operatively connected with the input of the voltage stabilizer means.

8. A voltage supply device according to claim 2, wherein the threshold comparator means upon reaching a predetermined minimum voltage of the vehicle battery energizes the electronic changeover switch means and the latter then operatively connects the voltage converter means with the positive potential of the vehicle battery.

9. A voltage supply device according to claim 8, wherein a charging resistance is connected in series with the storage condenser means and a discharge current diode is connected in parallel with the charging resistance.

10. A voltage power supply device according to claim 9, wherein a diode protecting against incorrect polarity connections is operatively connected ahead of the electronic changeover switch means.

11. A voltage supply device according to claim 10, wherein a further condenser means is operatively connected with the input of the voltage stabilizer means.

12. A voltage supply device according to claim 2, wherein a charging resistance is connected in series with the storage condenser means and a discharge current diode is connected in parallel with the chargin reistance.

13. A voltage power supply device according to claim 2, wherein a diode protecting against incorrect polarity connections is operatively connected ahead of the electronic changeover switch means.

14. A voltage supply device according to claim 2, wherein a further condenser means is operatively connected with the input of the voltage stabilizer means.

15. A motor vehicle passenger protection voltage supply device for a passenger protection installation in a vehicle comprising:
ignition circuit means for providing ignition current to an engine operatively connected between positive potential and ground of a vehicle battery and including a safety switch means, at least one primer pellet means for fusibly connecting said safety switch means and a controllable power switch means;
storage condenser means for storing voltage and for supplying energy to ignite said primer pellet means;
control circuit means including a voltage regulator means for a trigger sensor means which is operatively connected with said power switch means for the control thereof;
voltage converter means for supplying a converted voltage only in said control circuit means; and
electronic changeover switch means controllable by threshold comparator means for switching said voltage converter means into said control circuit means.

16. The device of claim 1, wherein said control circuit means includes said storage condenser means such that such voltage converter means also supplies a boosted voltage to said storage condenser means.

* * * * *

UNITED STATES PATENT AND TRADEMARK OFFICE
CERTIFICATE OF CORRECTION

PATENT NO. : 4,740,741

DATED : April 26, 1988

INVENTOR(S) : Andres et al.

It is certified that error appears in the above-identified patent and that said Letters Patent is hereby corrected as shown below:

Please insert the Assignee on the first page of the patent as follows:

Daimler-Benz Aktiengesellschaft, Stuttgart, Federal Republic of Germany

Signed and Sealed this

First Day of November, 1988

Attest:

DONALD J. QUIGG

Attesting Officer

Commissioner of Patents and Trademarks